(12) United States Patent
Margaryan et al.

(10) Patent No.: US 8,361,914 B2
(45) Date of Patent: Jan. 29, 2013

(54) OPTICAL COMPONENTS FOR USE IN HIGH ENERGY ENVIRONMENT WITH IMPROVED OPTICAL CHARACTERISTICS

(76) Inventors: Alfred A. Margaryan, Glendale, CA (US); Ashot A. Margaryan, Glendale, CA (US)

( * ) Notice: Subject to any disclaimer, the term of this patent is extended or adjusted under 35 U.S.C. 154(b) by 301 days.

(21) Appl. No.: 12/607,962

(22) Filed: Oct. 28, 2009

(65) Prior Publication Data

US 2010/0113245 A1   May 6, 2010

Related U.S. Application Data

(60) Provisional application No. 61/198,012, filed on Oct. 31, 2008, provisional application No. 61/180,880, filed on May 24, 2009, provisional application No. 61/185,190, filed on Jun. 8, 2009, provisional application No. 61/218,971, filed on Jun. 21, 2009.

(51) Int. Cl.
*C03C 3/19*   (2006.01)
*C03C 3/247*   (2006.01)

(52) U.S. Cl. .......................... 501/48; 501/44

(58) Field of Classification Search .................... 501/44, 501/48
See application file for complete search history.

(56) References Cited

U.S. PATENT DOCUMENTS

| | | | |
|---|---|---|---|
| 2,430,539 A | 11/1947 | Sun | |
| 2,481,700 A | 9/1949 | Sun et al. | |
| 2,511,225 A | 6/1950 | Sun | |
| 2,511,227 A | 6/1950 | Sun | |
| 3,846,142 A | 11/1974 | Buzhinsky et al. | |
| 3,941,672 A | 3/1976 | Tanaka et al. | |
| 4,040,846 A | 8/1977 | Broemer et al. | |
| 4,120,814 A | 10/1978 | Izumitani et al. | |
| 4,142,088 A | 2/1979 | Hirsch | |
| 4,182,664 A | 1/1980 | Marklad et al. | |
| 4,225,459 A | 9/1980 | Faulstich et al. | |
| 4,386,163 A | 5/1983 | Kodama | |
| 4,620,863 A | 11/1986 | Tomozawa et al. | |
| 4,642,297 A | 2/1987 | Mennemann et al. | |
| 4,771,020 A | 9/1988 | Omata et al. | |
| 4,885,019 A | 12/1989 | Hutta | |
| 4,946,490 A | 8/1990 | Hall et al. | |
| 4,962,067 A | 10/1990 | Myers | |
| 4,990,468 A | 2/1991 | Komiya et al. | |
| 5,017,520 A | 5/1991 | Otsuka et al. | |
| 5,032,315 A | 7/1991 | Hayden et al. | |
| 5,045,507 A | 9/1991 | Tran | |
| 5,068,209 A | 11/1991 | Meinert et al. | |
| 5,526,369 A | 6/1996 | Hayden et al. | |
| 5,635,109 A | 6/1997 | Otsuka | |
| 5,755,998 A | 5/1998 | Yamazaki et al. | |
| 5,809,199 A | 9/1998 | Tran | |
| 5,846,638 A | 12/1998 | Meissner | |
| 6,310,352 B1 | 10/2001 | Gross et al. | |
| 6,429,162 B1 | 8/2002 | Prassas | |
| 6,430,349 B1 | 8/2002 | Hayden et al. | |
| 6,495,481 B1 | 12/2002 | Margaryan | |
| 6,891,470 B2 | 5/2005 | Bohinc, Jr. | |
| 7,088,903 B2 | 8/2006 | Ishioka | |
| 7,211,783 B2 | 5/2007 | Beinhocker | |
| 7,371,703 B2 * | 5/2008 | Masumura et al. | 501/44 |
| 7,394,060 B2 | 7/2008 | Beinhocker | |
| 7,786,446 B2 | 8/2010 | Iwazaki | |
| 2003/0040421 A1 | 2/2003 | Margaryan | |
| 2003/0226971 A1 | 12/2003 | Chandross et al. | |
| 2005/0058424 A1 | 3/2005 | Ishioka | |
| 2005/0188724 A1 | 9/2005 | Ikenishi et al. | |
| 2005/0259944 A1 | 11/2005 | Anderson et al. | |
| 2006/0033983 A1 | 2/2006 | Dai et al. | |
| 2006/0245460 A1 | 11/2006 | Luo et al. | |
| 2007/0010390 A1 | 1/2007 | Margaryan | |
| 2009/0247387 A1 * | 10/2009 | Ikenishi | 501/44 |
| 2009/0255297 A1 | 10/2009 | Margaryan et al. | |

FOREIGN PATENT DOCUMENTS

| | | | |
|---|---|---|---|
| CN | 101269913 A | * | 9/2008 |
| JP | 57-123842 | | 8/1982 |
| JP | A 2005075687 | | 3/2005 |
| JP | 2005-112717 | | 4/2005 |
| JP | A 2005112717 | | 4/2005 |

OTHER PUBLICATIONS www.aforesearch.com; AFO Research's Next Generation Specialty Optical Glasses Provide Market Changing Opportunities for Medical, Commercial Laser, and Communications Industries.
Stokowski et al., "Optical and Lasing Properities of Fluorophosphate Glass", Jorunal of Non-Crystaline Solids 40 (1980) 481-487, North Holland Publishing Comppany.
EPO Office action for case 06786351.4; Mar. 16, 2011.
JPO—Office action for JP2008-519723; Dec. 21, 2011.
File History for U.S. Appl. No. 13/083,624, filed Apr. 11, 2011; Inventor Alfred A. Margaryan.
Laser damage resistance of photo-thermal-refractive glass bragg gratings; Glebov et al.; University of Central Florida; 2004. www.aforesearch.com; From: Allpoints AFO Research's Next Generation Specialty Optical Glasses Provide Market Changing Opportunities for Medical, Commercial Laser, and Communications Industries http://www.aforesearch.com/news/afonews1.html Jan. 25, 2007.
www.aforesearch.com; dallasnews.com; PR Newswire AFO Research's Next Generation Specialty Optical Glasses Provide Market Changing Opportunities for Medical, Commercial Laser, and Communications Industries; Jan. 25, 2007.
www.aforesearch.com; L.A. Times; AFO Research's Next Generation Specialty Optical Glasses Provide Market Changing Opportunities for Medical, Commercial Laser, and Communications Industries; Jan. 25, 2007.
www.aforesearch.com; Welcome to MDMA's Industry News Daily News Headlines from:AFO Research's Next Generation Specialty Optical Glasses Provide Market Changing Opportunities for Medical, Commercial Laser, and Communications Industries; Jan. 25, 2007.

(Continued)

*Primary Examiner* — Karl Group
*Assistant Examiner* — Elizabeth A Bolden
(74) *Attorney, Agent, or Firm* — Patent Law Agency, LLC; Peter Ganjian

(57) ABSTRACT

Optical components that maintain transparency (remain clear) in high energy environments, including in applications of high-intensity gamma-ray radiation dosage of $1.29 \times 10^9$ rads and greater, and neutron energy at neutron fluxes ranging from $3 \times 10^9$ to $1 \times 10^{14}$ n/cm$^2$ sec and greater, and fluencies ranging from $2 \times 10^{16}$ to $8.3 \times 10^{20}$ n/cm$^2$ and greater. Further, the optical components have a bulk laser damage threshold of 105+/−20 J/cm$^2$, a surface laser damage threshold of 72+/−15 J/cm$^2$, a Stokes shift of about 9%, and a fractional thermal loading of about 11%.

15 Claims, 9 Drawing Sheets

OTHER PUBLICATIONS www.aforesearch.com; PR NewsWire; AFO Research's Next Generation Specialty Optical Glasses Provide Market Changing Opportunities for Medical, Commercial Laser, and Communications Industries; Jan. 25, 2007.

PCT/US2006/026169; WO 2007/005953 A3; International search report and PCT application publication: Bismuth containing fluorophosphate glass and method for making thereof. www.wipo.int.

PCT/2009/62652; WO 2010/051393; International Search Report and PCT application publication; optical components for use in high energy environments with improved optical characteristics.

WO 9913541; Mar. 1999.

Fluorophosphate vitreous systems; From Alfred Margaryan; Legands and Modifiers in Vitreous Materials; Spectroscopy of Condensed Systems; Publisher: World Scientific; Singapore, New Jersey, London Hong Kong; 1999.

"The Bismuth Atom Neighborhood in Bismuth Silicate Glasses From X-Ray Absorption Experiment," by Agniezka Witkowska et al., 6th International Conference on Intermolecular Interaction in Matter, Gdansk-Poland, Sep. 10-13, 2001. http://www.mif.pg.gda.pl/iim2001/abstracts/witkowska.html.

"Ultrafast Optical Switch and Wavelength Division Multiplexing (WDM) Amplifiers Based on Bismuth Oxide Glasses", by Naoki Sugimoto, Research Center, Asahi Glass Co., Ltd., Yokohama 221-8755, vol. 85 No. 5, May 2002 Japan http://cat.inist.fr/?aModele=afficheN&cpsidt=13677293.

"Spectroscopic properties of Mn2+ in new bismuth and lead contained fluorophosphates glasses," by A. Margaryan et al., published in Applied Physics, B78, 409-413 (2004).

"Erbium—doped potassium bismuth gallate glass," Wong et al., vol. 19, Issue 8, 1839-1843, Aug. 2002, by S. Q. Man et al., Optics Infobase, published by OSA. http://www.opticsinfobase.org/josab/abstract.cfm?uri=josab-19-8-1839.

"Emission properties of PbO- Bi2O3-Ga2O3-GeO2 glasses doped with Tm3+ and Ho3+," Jay Hyok Song et al., Photonic Glass Laboratory, Department of Material Science and Engineering, Pohang University of Science and Technology, San 31, Hyoja-dong, Nam-gu, Pohang, Gyeongbuk 790-784, Republic of Korea. Journal of Applied Physics—Jun 15, 2003, vol. 93, Issue 12, pp. 9441-9445; http://scitation.aip.org/getabs/servlet/GetabsServlet?prog=normal&id=JAPIAU0000930000 12009441000001& idtype=cvips& gifs=yes.

Optical Engineering, vol. 6, Optical Materials, An Introduction to Selection and Application, Soloman Musikant, pp. 40 to 45.

"Physical Properties of Novel Lead Bismuthate Glasses with Large Transmitting Windows", Sun Hong Tao et la., Shanghai Institute of Optics and Fine Mechanics, Chinese Academy of Sciences, Shanghai 201800, 2004 Chinese Physics. Lett. 21 1759-1761; http://www.iop.org/EJ/abstract/0256-307X/21/9/023.

"Ligands and Modifiers in Vitreous Materials, Spectroscopy of Condensed Systems," Alfred A. Margaryan, World Scientific Pub. Inc., 1999. http://www.aforesearch.com/scientificpublication.html.

"Spectroscopy of Activated Fluoroberyllate Glasses," Alfred A. Margaryan and Manvel G. Manvelyan, Hayastan Press, Yerevan, 1974, pp. 15-113. http://www.aforesearch.com/scientificpublication.html.

Nuclear and Space Radiation Effects on Materials (NASA Space Vehicle Design Criteria), NASA SP-8053, 1970.

"New Technique to Apply Optical Fiber Image Guide to Nuclear Facilities," Atsushi Kimura, Eiji Takada, Yoneichi Hosono, Masaharu Nakazawa, Hiroyuki Takahashi and Hiroyuki Haymi, Journal of Nuclear Science and Technology, vol. 39, No. 6, pp. 603-607, 2002.

"Radiation Effects Dataon Commercially Available Optical Fiber: Database Summary," Melanie N. Ott, Sigma Research and Engineering, Code 562, NASA Goddard Space Flight Center, Greenbelt, Maryland, USA.

"Application of General Purpose Fiber Optic Data Links to Radiation Measurements," Eiji Takada and Toshimitsu Komatsu, Journal of Nuclear Science and Technology, vol. 40, No. 6, pp. 363 to 369, 2003.

"Gamm-Radiation Resistant Fabry-Perot Fiber Optic Sensors," Hanying Liu, Don W. Miller and Joseph Talnagi, Review of Scientific Instruments, vol. 73, No. 8, 2002.

"Radiation Damage," Stefania Baccaro, (Italian National Agency for New Technology, Engergy and the Environment, Advanced Physics Technologies), Submitted to World Scientific, Feb. 13, 2002.

"Dopant and concentration dependence of linear and nonlinear refractive index and dispersion for new (Mg, Ba) F2 based Fluorophosphate Glasses," Ju H. Choi, Frank G. Shi, Alfred A. Margaryan, Ashot A. Margaryan, T. G. Nieh, Proc. SPIE, 4970, 82-88, (2003).

"EXAFS spectroscopic study of PbO-Bi2O3-Ga2O3 glasses," Yong Gyu Choi et al., Journal of Non-Crystalline Solids, 259, 205-211 (1999)—Abstract.

"Spectroscopic properties and thermal stability of erbium-doped bismuth-based glass for optical amplifier," Jianhu Yan et al., Shanghai Institute of Optics & fine Mechanics, Chinese Academy of Science, Shanghai 201800, China, Journal of Applied Physics, Jan. 15, 2003, vol. 93, Issue 2, Abstract.

PCT/US2006/026169; PCT Pub No. WO 2007/005953; Publications, Including International Search Report, International Written Opinion—from www.wipo.int.

Publication: Alfred Margaryan;"Fluorophosphate Vitreous Systems;" World Scientific; Singapore, N.J., London, Honk Hong 1999. Physics and Chemistry of Rare-Earth Ions Doped Glasses; Editors: Nandyala Sooraj Hussain & José Domingos Da Silva Santos; vols. 46-47;2008; Chapter 2; http://www.aforesearch.com/scientificpublication.html.

Dependence of thermo-mechanical and mechanical properties of novel fluorophosphate glass on various rare earth dopants, Journal of Materials Science vol. 43, No. 3, 2008, pp. 1109-1113; http://www.aforesearch.com/scientificpublication.html http://www.aforesearch.com/scientificpublication.html.

Novel alkaline-free Er3+-doped fluorophosphate glasses for broadband optical fiber lasers and amplifiers; Journal of Alloys and Compounds, vol. 450, Issues 1-2, 2008, pp. 540-545 http://www.aforesearch.com/scientificpublication.html.

Fluorescence and Nonradiative Properties of Nd3+ in Novel Heavy Metal Contained Fluorophosphate Glass; Advances in OptoElectronics vol. 2007 (2007), Article ID 39892, 8 pages doi:10.1155/2007/39892 http://www.aforesearch.com/scientificpublication.html.

Rare Earth Doped Photonic Glass Materials for the Miniaturization and Integration of Optoelectronic Devices; From 39th International Symposium on Microelectronics, Oct. 8-12, 2006 San Diego, California, USA http://www.aforesearch.com/scientificpublication.html.

Optical absorption and emission properties of Nd3+ doped fluorophosphates glass for broadband fiber amplifier applications; From Photonics West, Jan. 25-31, 2003, San Jose California, USA. http://www.aforesearch.com/scientificpublication.html.

Spectral properties of Nd 3+ ion in new fluorophosphates glasses: Judd-Ofelt intensity parameters; From Photonics West, Jan. 25-31, 2003, San Jose California, USA. http://www.aforesearch.com/scientificpublication.html.

Novel Broadband and Eye-safe Laser Source Materials: Alkaline-free Yb3+ doped Fluorophosphate Glasses for Fiber and Waveguade Lasers P4. Yb3+ doped Fluorophosphate glasses for fiber and waveguide lasers; From "The International Symposium on Photonic Glasses" Abstract Oct. 14-17, 2002 Shanghai, P.R. China http://www.aforesearch.com/scientificpublication.html.

Refractive index and low dispersion properties of new fluorophosphate glasses highly doped with rare-earth ions; Journal of Materials Research, Jan. 2005—vol. 20, No. 1, pp. 264-270 http://www.aforesearch.com/scientificpublication.html.

Optical transition properties of Yb3+ in new fluorophosphate glasses with high gain coefficient; Journal of Alloys and Compounds 2005—vol. 396, Issue 1-2, pp. 79-85 http://www.aforesearch.com/scientificpublication.html.

Judd—Ofelt analysis of spectroscopic properties of Nd3+-doped novel fluorophosphate glass; Journal of Luminescence, Sep. 2005—vol. 114, Issues 3-4, pp. 167-177 http://www.aforesearch.com/scientificpublication.html.

Spectroscopic properties of Yb3+ in heavy metal contained fluorophosphate glasses; Materials Research Bulletin Dec. 2005—vol. 40, Issue 12, pp. 2189-2197 http://www.aforesearch.com/scientificpublication.html.

Lasers, Optics, and photonics resources and news; Yb(III) in new fluorophosphate glasses with high gains coefficient; Oct. 29, 2005.
www.AFOResearch.com; Laser Focus World, vol. 44,Issue 6 Jun. 2008; New optical fiber remains transparent under extreme gamma radiation.
www.AFOResearch.com; Laser Focus World, vol. 44, Issue 2 Feb. 2008; Specialty glass.
www.AFOResearch.com; Optical Glass; www.Photonics.com; Mar. 1, 2007.
www.AFOResearch.com; Laser Focus World—Jan. 2007; Fluorophosphate glass.
www.AFOResearch.com; Laser Focus World—Dec. 2006; Fluorophosphate glasses have high spectroscopic quality factors.
www.AFOResearch.com; Lasers, optics and photonics resources and news; Novel Fluorophosphate Glasses with Extremely High Spectroscopic Quality Factors. Nov. 27, 2006.
www.aforesearch.com; Lasers, optics and photonics resources and news; High level Gamma and Neutron radiation resistant non-silica glass; Date announced: Aug. 27, 2005.
www.aforesearch.com Lasers, optics and photonics resources and news; Yb(III) in New Fluorophosphate Glasses with High Gain Coefficient; Date announced: Oct. 29, 2005.
www.aforesearch.com Lasers, optics and photonics resources and news; Heavy Metal Contained Fluorophosphate Glasses with Extremly High Gain Coefficient; Date announced: Nov. 8, 2005.
USPTO Office action dated Aug. 16, 2011 for U.S. Appl. No. 13/083,624, filed Apr. 11, 2011.
Office Action form Canadian Patent Office dated Oct. 4, 2012; Title of Canadian Patent Application: Optical Components for Use in High Energy Environment With Improved Optical Characteristics; First Named Inventor: Alfred A. Margaryan.
WO 2007/005953 A2; Margaryan et al. Jan. 11, 2007; PCT/US2006/026169; U.S. Appl. No. 11/174,486, filed Jul. 5, 2005; Same as US Patent 7608551.
57-123842; Japan; Pub Date: Aug. 2, 1982; Inventor: Kodama Hiroyuke; Abstract In English.
2007-112717; Japan; Pub Date: Apr. 28, 2005, Inventor: Ishioka Junko; Abstract In English.
Letter From Japan Firm In English That May Include Information That May Be Of Help To Examiner; Includes List Of References Cited. Date: Dec. 5, 2012.
Japan Office Action For Case 2011-534788; Dec. 3, 2012.

* cited by examiner

| Scan Line | Roughness p-v | RMS | Ave |
|---|---|---|---|
| A | 103 Å | 18.7 Å | 14.6 Å |
| B | 109 Å | 21.9 Å | 17.4 Å |
| C | 104 Å | 19.3 Å | 14.9 Å |
| D | 157 Å | 23.8 Å | 18.9 Å |
| Ave. | 118 Å | 21.0 Å | 16.4 Å |

FIG. 4B

| Scan Line | Roughness p-v | RMS | Ave |
|---|---|---|---|
| A | 102 Å | 22.3 Å | 17.8 Å |
| B | 243 Å | 30.6 Å | 22.2 Å |
| C | 102 Å | 24.6 Å | 20.4 Å |
| D | 83.5 Å | 19.4 Å | 16.0 Å |
| Ave. | 132 Å | 24.2 Å | 19.1 Å |

FIG. 4D

OPTICAL COMPONENTS FOR USE IN HIGH ENERGY ENVIRONMENT WITH IMPROVED OPTICAL CHARACTERISTICS

CROSS-REFERENCE TO RELATED APPLICATIONS

This Application claims the benefit of priority of the co-pending U.S. Utility Provisional Patent Application No. 61/198,012, filed 31 Oct. 2008, the co-pending U.S. Utility Provisional Patent Application No. 61/180,880, filed 24 May 2009, the co-pending U.S. Utility Provisional Patent Application No. 61/185,190, filed 8 Jun. 2009, and the co-pending U.S. Utility Provisional Patent Application No. 61/218,971, filed 21 Jun. 2009, the entire disclosures of all Applications are expressly incorporated by reference in their entirety herein.

BACKGROUND OF THE INVENTION

1. Field of the Invention

This invention relates to fluorophosphate based optical components with improved optical characteristics for use in high energy environments.

2. Description of Related Art

Some of the known conventional optical components have some levels of radiation resistance, but that level of resistance is not sufficient for their use in high energy environments.

Examples of optical components with different levels of radiation resistant characteristics can be seen in bismuth metaphosphate based glass systems that solarize after being exposed to a few hundred kilo rads of gamma radiation. Other examples include the $SiO_2$ base optical components, which are well-known as poor performers under high energy environments in that they darken under very low levels of gamma radiation, making them very impractical for uses in high energy environments. Other optical components comprised of phosphate based glasses of varying compositions contain alkaline elements, which are also known to actually reduce and lower the overall radiation resistance of the final product, thus rendering them very impractical for use in any high energy environments. Other optical components used include the germanium dioxide based network structures, which are not suitable for radiation resistance due to the presence of $GeO_2$.

With respect to the optical characteristics of the above optical components and, in particular in relation to their surface laser damage threshold, most have a very low surface laser damage threshold as indicated in the following table:

| Surface Laser Damage Threshold | |
|---|---|
| Optical Component | Surface Laser damage threshold |
| Schott glass Products phosphate glasses LG750 | ~30 $J/cm^2$ |
| Corning glass products silica glasses 7940 | ~38 +/− 2 $J/cm^2$ |
| Corning glass products borosilicate glass 0211 | ~32 $J/cm^2$ |
| Bismuth containing fluorophosphate glass | ~29 $J/cm^2$ |

Therefore, the above optical components cannot be used in high laser energy environments, which requires thresholds that are 60 $J/cm^2$ or higher.

Accordingly, in light of the current state of the art and the drawbacks to current optical components, a need exists for an optical component that would have a high-energy resistance and superior active and passive optical characteristics.

BRIEF SUMMARY OF THE INVENTION

The present invention provides optical components that maintain transparency (remain clear) in high energy environments, including in high-intensity gamma-ray radiation dosage of $1.29 \times 10^9$ rads and greater, and high neutron energy at neutron fluxes ranging from $3 \times 10^9$ to $1 \times 10^{14}$ $n/cm^2$ sec and greater, and fluencies ranging from $2 \times 10^{16}$ to $8.3 \times 10^{20}$ $n/cm^2$ and greater. Further, the optical components have a bulk laser damage threshold of $105+/-20$ $J/cm^2$, a surface laser damage threshold of $72+/-15$ $J/cm^2$, a Stokes shift of about 9%, and a fractional thermal loading of approximately 11%.

One exemplary aspect of the present invention provides an optical component, comprising:
  a metaphosphate $Ba(PO_3)_2$, 10 to 60 mol %;
  a metaphosphate $Al(PO_3)_3$, 10 to 60 mol %;
  fluorides $BaF_2+RF_3$, 20 to 90 mol %;
  where R is selected from one of Y and La;
  with dopant selected from one of $Yb_2O_3$ and $YbF_3$ 0.5 to 10 wt % over 100.

Another exemplary aspect of the present invention provides an optical component, comprising:
An optical component, comprising:
  a metaphosphate $Ba(PO_3)_2$, 20 to 50 mol %;
  a metaphosphate $Al(PO_3)_3$, 10 to 60 mol %;
  fluorides $BaF_2+RF_3$, 20 to 90 mol %;
  where R is selected from one of Y and La;
  with dopant selected from one of $Yb_2O_3$ and $YbF_3$ 0.5 to 15 wt % over 100.

A further exemplary aspect of the present invention provides an optical component, comprising:
  a metaphosphate $Ba(PO_3)_2$, 10 to 60 mol %;
  a metaphosphate $Al(PO_3)_3$, 10 to 60 mol %;
  fluorides $BaF_2+RF_3$, 10 to 75 mol %;
  where R is selected from one of Y and La;
  with dopant selected from one of $Yb_2O_3$ and $YbF_3$ 0.5 to 10 wt % over 100.

Another exemplary aspect of the present invention provides an optical component, comprising:
  a metaphosphate $Ba(PO_3)_2$, 5 to 60 mol %;
  a metaphosphate $Al(PO_3)_3$, 5 to 60 mol %;
  fluorides $BaF_2+RF_3$, 10 to 90 mol %;
  where R is selected from one of Y and La;
  with dopant selected from one of $Yb_2O_3$ and $YbF_3$ 0.2 to 20 wt % over 100.

Still another exemplary aspect of the present invention provides an optical component, comprising:
  a metaphosphate $Ba(PO_3)_2$ in mol %,
  a metaphosphate $Al(PO_3)_3$ in mol %,
  fluorides $BaF_2+RFx$ in mol %,
  with dopant selected from one of $Yb_2O_3$ and $YbF_3$ over 100 percent (wt %) of the composition above Yb;
  where:
  R is selected from the group consisting of Mg, Ca, Bi, Y, La;
  x is an index representing an amount of fluorine (F) in the compound RFx;
  with the optical components maintaining transparency in high energy environments:
  including application of high-intensity gamma-ray radiation dosage of $1.29 \times 10^9$ rads and more; and application of neutron energy at neutron fluxes ranging from $3 \times 10^9$ to $1 \times 10^{14}$ n/cm$^2$ sec and more, and fluencies ranging from $2 \times 10^{16}$ to $8.3 \times 10^{20}$ n/cm$^2$ and greater; and with a bulk laser damage threshold of 105+/−20 J/cm$^2$, and a surface laser damage threshold of 72+/−15 J/cm$^2$.

One exemplary optional aspect of the present invention provides an optical component, wherein:
the optical component is one of a solid state laser host and solid state amplifier host, with dopant selected from one of Yb$_2$O$_3$ and YbF$_3$ 0.5 to 5 wt % over 100.

Another exemplary optional aspect of the present invention provides an optical component, wherein:
the optical component is a thin disc laser host, with dopant selected from one of Yb$_2$O$_3$ and YbF$_3$ 1 to 20 wt % over 100.

A further exemplary optional aspect of the present invention provides an optical component, wherein:
the optical component is one of a fiber laser host and fiber amplifier host with dopant selected from one of Yb$_2$O$_3$ and YbF$_3$ 0.5 to 3 wt % over 100.

Still a further exemplary optional aspect of the present invention provides an optical component, wherein:
the optical component is one of a window, mirror, and thin film covering for a solar panel, with dopant selected from one of Yb$_2$O$_3$ and YbF$_3$ 1 to 10 wt % over 100.

Another exemplary optional aspect of the present invention provides an optical component, wherein:
the optical components is one of a lens, with dopant selected from one of Yb$_2$O$_3$ and YbF$_3$ 0.5 to 5.5 wt % over 100.

A further exemplary optional aspect of the present invention provides an optical component, wherein:
a Stokes shift of the optical component is about 9%, and a fractional thermal loading of about 11%.

Still a further exemplary optional aspect of the present invention provides an optical component, wherein:
the Yb dopant simultaneously functions to act as a desolarizer in high energy environments to maintain the optical components transparent and functions to act as laser dopant, when stimulated.

Another exemplary aspect of the present invention provides an optical component, comprising:
fluorophosphate glass system that maintains transparency in high energy environments, including in high-intensity gamma-ray radiation dosage of $1.29 \times 10^9$ rads and greater, and neutron energy at neutron fluxes ranging from $3 \times 10^9$ to $1 \times 10^{14}$ n/cm$^2$ sec and greater, and fluencies ranging from $2 \times 10^{16}$ to $8.3 \times 10^{20}$ n/cm$^2$ and greater; and
having a bulk laser damage threshold of 105+/−20 J/cm$^2$, and a surface laser damage threshold of 72+/−15 J/cm$^2$.

Another exemplary optional aspect of the present invention provides an optical component, wherein:
the optical component is one of:
a solid state laser host; a solid state amplifier host; a thin disc laser host; a fiber laser host; a fiber amplifier host; a window, a thin film covering for a solar panel, a mirror and a lens.

Still another exemplary optional aspect of the present invention provides an optical component, wherein:
a Stokes shift of the optical component is about 9%, and a fractional thermal loading of about 11% when stimulated with 945 nm wave energy.

A further exemplary optional aspect of the present invention provides an optical component, wherein:
the optical components are polished to a Roughness$_{p-v}$ of 118 Å to 132 Å.

Still a further exemplary optional aspect of the present invention provides an optical component, wherein:
a draw temperature $T_D$ of the optical components to form an optical fiber is substantially different from that of a crystallization temperature $T_C$, with the draw temperature equaling to about 690° C.

Another exemplary optional aspect of the present invention provides an optical component, wherein:
fluorophosphate glass system includes a Yb dopant that simultaneously functions to act as a desolarizer in high energy environments to maintain the optical components transparent and functions to act as laser dopant, when stimulated.

Still another exemplary optional aspect of the present invention provides an optical component, wherein:
the optical component is a lens with an Abbe number of approximately 64 to 68 remains constant regardless of an increase in linear refractive index, with non-linear refractive index remaining low at about $n_2=1.42 \times 10^{-13}$ esu.

Another exemplary optional aspect of the present invention provides an optical component, wherein:
fluorophosphate glass system is comprised of:
a metaphosphate Ba(PO$_3$)$_2$ in mol %,
a metaphosphate Al(PO$_3$)$_3$ in mol %,
fluorides BaF$_2$+RFx in mol %,
with dopant selected from one of Yb$_2$O$_3$ and YbF$_3$ over 100 percent (wt %) of the composition above Yb;
where:
R is selected from the group consisting of Mg, Ca, Bi, Y, La; and
x is an index representing an amount of fluorine (F) in the compound RFx.

Such stated advantages of the invention are only examples and should not be construed as limiting the present invention. These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding part(s) throughout:

FIG. 4B is a table, which details the numerical data with respect to the surface quality in terms of polished optical component end product for the side shown in FIG. 4A;

FIG. 4D is a table, which details the numerical data with respect to the surface quality in terms of polished optical component end product for the side shown in FIG. 4C.

DETAILED DESCRIPTION OF THE INVENTION

Figure 1A:
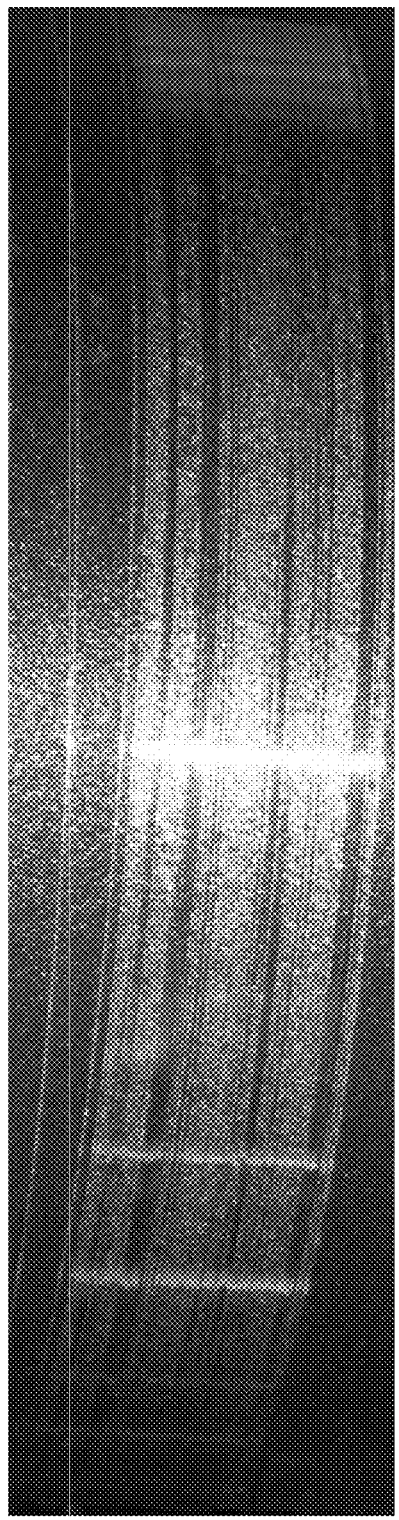
FIG. 1A is an exemplary view of a first optical component sample of the present invention in an exemplary form of an exemplary fiber core in accordance with the present invention.

The detailed description set forth below in connection with the appended drawings is intended as a description of presently preferred embodiments of the invention and is not intended to represent the only forms in which the present invention may be constructed and or utilized.

For the sake of convenience and clarity, this disclosure uses the phrase "energy" in terms of both wave and particle energies. Further, this disclosure defines high energy wave (i.e., high Electromagnetic Radiation or EMR) as those in the gamma ray frequencies (greater than $10^{19}$ Hz or higher). In addition, this disclosure defines high particle energy in terms of average neutron fluxes of at least $3 \times 10^9$ n/cm² sec, and average neutron fluences of at least $2 \times 10^{16}$ n/cm². Accordingly, this invention defines the collective phrases "high energy," "high radiation," "high radiation energy," "high energy environment" and so on as energy defined by the above high wave energy and high particle energy parameters.

In addition, throughout the disclosure, the words "solarize" and its derivatives such as "solarization," "solarized," and so on define the darkening, browning, and/or burning up of materials due to exposure to various amounts of radiation. The words "desolarize" and its derivatives such as "desolarization," "desolarized," and so on define the ability of a material to continuously resist (or reverse) the solarization process while exposed to high energy.

The optical components of the present invention may be used as a host of a system, with "host" defined as a medium (passive or active) within the system that serves to perform one or more function. One non-limiting example of an optical component of the present invention used as a host may include a laser glass (active), which is the medium that serves as laser material (or laser host material) that functions to emit laser energy when excited.

The optical components of the present invention have applications in numerous fields, and may be used in high energy environments that may also require high laser damage threshold and further, may also be used to produce radiation resistant shielding material. Non-limited, non-exhaustive list of examples of applications of the optical components of the present invention may include optical windows, substrate for optical minors, solar panel covers, space solar panel covers, lenses, fiber, and etc. Other non-limited, non-exhaustive list of examples of applications of the optical components of the present invention used as hosts may include fiber amplifier host, solid state amplifier host, fiber lasers host, solid state laser hosts (e.g., thin disc laser (active mirror)), etc.

In particular, this invention provides an optical component based on fluorophosphate glass systems with Ytterbium dopant, but without using Alkali or Alkali-fluorides, lead or lead-fluoride, or bismuth metaphosphate. The optical components of the present invention are 100% lead free, which makes them environmentally friendly. In addition, the lead free optical components of the present invention further provide a very high leaching resistance, confining any potential radiation residue within the optical component. That is, after exposure to radiation energy, the optical component of the present invention maintain and confines most radiation residue within (prevents leaching), even if placed into other solutions such as water or exposed to other moisture content (e.g., acidic or base). Non-limiting examples of fluorophosphate based glass systems (but without lead or lead-fluoride), which may be used in the optical components of the present invention are disclosed in the U.S. Patent Application Publication 2003/0040421 to Margaryan, the entire disclosure of which is expressly incorporated by reference in its entirety herein.

In particular, the optical components of the present invention may include the following fluorophosphate glass systems $\{Ba(PO_3)_2, Al(PO_3)_3, BaF_2+RFx\}+\{dopant\}$, where RFx is selected from the group $MgF_2$, $CaF_2$, $BiF_3$, or related fluorides (but not Alkali-fluorides or lead-fluoride), and the dopant may include, at minimum, $Yb_2O_3$ or $YbF_3$. Optionally, co-dopants such as MnO or $MnF_2$ may also be included. The glass system $Ba(PO_3)_2$—$Al(PO_3)_3$—$BaF_2$+RFx+dopant use dopant from the group of oxides or fluorides of the rare earth elements over 100 percent (wt %) of the composition above Yb and mixtures thereof.

An exemplary, preferred material for the present invention are optical components that are based on or contain $Ba(PO_3)_2$, 10 to 60 mol %; $Al(PO_3)_3$, 10 to 60 mol %; $BaF_2$+RFx, 20 to 90 mol % (where RFx is selected from the group $MgF_2$, $CaF_2$, $BiF_3$); and one of a dopant of $Yb_2O_3$ of 0.5 to 20 weight % or fluoride $YbF_3$ of 0.5 to 20 weight %. The raw compounds used for glass formation are: Barium Metaphosphate, $Ba(PO_3)_2$, and Aluminum Metaphosphate, $Al(PO_3)_3$, which are considered chemically stable (durable) substances, resistant against dissolving in water or other moisture content (e.g., acidic or base).

Another non-limiting example of fluorophosphate based glass system that may be used in the optical components of the present invention may include fluorophosphate glass systems with Ytterbium dopant containing $Ba(PO_3)_2$, $Al(PO_3)_3$, $BaF_2$ and RFx, where RFx is selected from the group $MgF_2$, $CaF_2$, $BiF_3$, $YF_3$, $LaF_3$, or related fluorides (but not Alkali-fluorides or lead-fluoride) and, one of $Yb_2O_3$ and $YbF_3$. That is, glass system $Al(PO_3)_3$—$Ba(PO_3)_2$—$BaF_2$+RFx+dopant use dopant from the group of oxides or fluorides of the rare earth elements over 100 percent (wt %) of the composition above Yb and mixtures thereof. The introduction of Yttrium Fluoride $YF_3$ and Lanthanum Fluoride $LaF_3$ improved the overall performance and efficiency of these glasses. The preferred material for the optical components using the $YF_3$ may contain $Ba(PO_3)_2$, 10 to 60 mol %; $Al(PO_3)_3$, 10 to 60 mol %; $BaF_2$+RFx, 20 to 90 mol %; and one of a dopant of $Yb_2O_3$ of 0.5 to 20 weight % or fluoride $YbF_3$ of 0.5 to 20 weight %.

The $YF_3$ dramatically increased the glass forming domain allowing the introduction of up to 60 mol % of $YF_3$, and improved the optical properties such as higher Emission Cross Section from 0.87 to 1.37 pm² at lasing wavelength of approximately 996 nm, extremely high Gain Coefficient G=0.95 to 1.65 ms*pm⁴ and Quantum Efficiency of about 90-94%. These improvements further enhanced the performance of the overall radiation resistant by improving the optical characteristics of the radiation resistant optical components such as radiation resistant laser host material and fibers. The LaF₃ Lanthanum Fluoride dramatically improves the Abbe Number (dispersion) to 64-68 and reduces the chromatic aberration by about 20-30%. Stable Abbe Number and low chromatic aberration is extremely important for the radiation resistant lenses. The above improved characteristics due to the introduction of LaF₃ further enhances the accuracy and the precision of the radiation resistance lenses and allows the creation of smaller and flatter lenses. The reduction of the sizes of the lenses increases their overall application in different industries, including optical based electronics systems. The presence of BaF₂+RFx(YF₃, LaF₃, CaF₂, MgF₂, and BiF₃) effectively increases the chemical durability of the laser material. In the grouping of glasses according to chemical stability of non-silicate glasses relating to humidity or moisture, the optical components of the present invention are considered to be stable.

It should be noted that although references to optical components and in particular, glass systems used in the optical components throughout most (but not all) of the remainder of the disclosure may be directed to non-limiting examples of fluorophosphate based glass systems disclosed in the U.S. Patent Application Publication 2003/0040421 to Margaryan, these references are only meant as illustrative and for convenience of example and should not be limiting.

Radiation resistant characteristics of the optical components of the present invention provide high resistance against high levels of energy without change in the transparency (e.g., browning or darkening of the optical component—no solarization). The combination of unique molecular structure, such as large atomic radius, high electro-negativity of fluorine, and the reverse change of valency of Yb (III) dopant enables these optical components to achieve high solarization resistance. During the gamma ray or neutron fluxes (and fluencies) exposure, the Yb (III) dopant creates a continuing de-solarization process that enable the optical component of the present invention to remain transparent due to the Yb (III) having a remarkably high transformation of valency of approximately 90-95%. That is, when the Yb (III) is bombarded by the gamma, neutron or other high energy (radiation/particle), the transformation of the valency of Yb from Yb(III) to Yb(II) and vice versa constantly reoccurs, and allows the glass matrix to remain transparent, in accordance with the following:

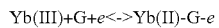

Yb(III)+G+e<->Yb(II)-G-e

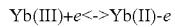

Yb(III)+e<->Yb(II)-e

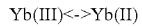

Yb(III)<->Yb(II)

where G is energy of the Gamma ray, and e is the electron.

In order for Yb (III) to become ionized and to create the transformation process of Yb (III) to Yb (II) and vice versa, a 6.4 eV (electron volt) energy is required.

Wavelengths starting from 190 nm (e.g., far Ultraviolet—UV) up to high levels of X-Ray and Gamma ray are capable of producing the required 6.4 eV or higher for the Yb (III) dopant to achieve the reverse or continuing transformation, thereby, maintain the optical components of the present invention transparent in high energy environments. The Electron Volt Energy for each Wavelengths can be measured by utilizing the following formula:

$$E = hf = \frac{hc}{\lambda} = \frac{1240 \text{ nm}}{\lambda} \text{ eV}$$

Where E is energy, f is frequency, λ is the wavelength of a photon, h is Planck's Constant and is c is the speed of light.

Figure 1B:
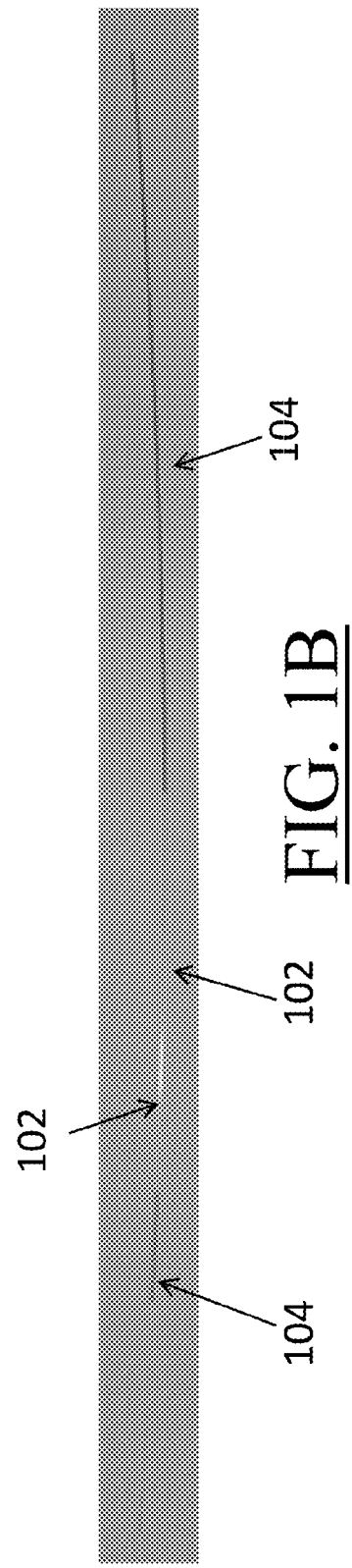
FIG. 1B is an exemplary view of the first optical component shown in FIG. 1A, but after application of high energy in accordance with the present invention.
Figure 1C:
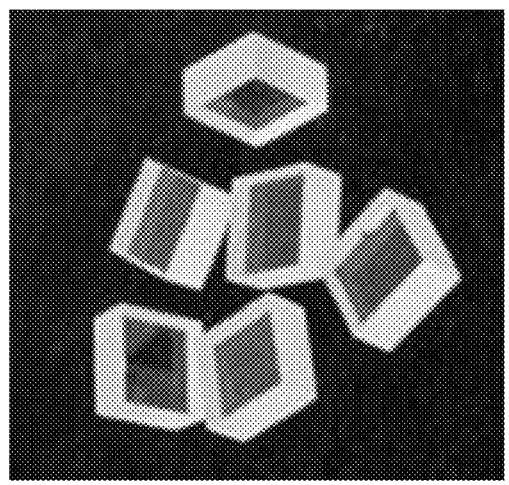
FIG. 1C is an exemplary view of a second optical component sample of the present invention in an exemplary form of a rectangular-cube, after the application of high energy in accordance with the present invention.

Two different optical component samples of the present invention have been tested in high-energy environments (i.e., high levels of gamma radiation and neutron energy), with the result that the samples maintained their transparency. FIG. 1A is an exemplary view of the first optical component sample of the present invention in the exemplary form of a fiber core only (without the cladding) with exemplary dimensions of about 179 μm of diameter, before the application of any high energy radiation. Further included with the fiber core of the present invention illustrated in FIG. 1A is an optional organic acrylate-coating (of about 284 μm diameter), which enables users to actually handle the fiber core shown in FIG. 1A. FIG. 1B is an exemplary view of the same first optical component sample shown in FIG. 1A, but after application of high energy. FIG. 1C is an exemplary view of a second optical component sample of the present invention in the exemplary form of a rectangular-cube with exemplary dimensions of 3 mm×5 mm×5 mm, after the application of high energy.

It should be noted that both of the optical component samples of the present invention (FIG. 1A and FIG. 1C) were transparent in the visible spectral region before exposure to any radiation. The tests that were conducted for both samples of the present invention were in a high-intensity gamma-ray environment, and were done so at a level of 1.8×10⁶ rad per hour for 30 days in Cobalt-60 irradiator, where the total gamma-radiation dosage was 1.29×10⁹ rad. After withstanding such high levels of radiation, both of the optical component samples of the present invention remained transparent with no occurrence of any solarization. As shown in FIG. 1B, the actual optical sample fiber remained clear and transparent (sections 102). The darkened sections 104 of the fiber sample of the present invention shown in FIG. 1B is the optional organic acrylate-coating that burned as a result of the exposure to high energy environment, which is easily wiped clean with a cloth. Further, as illustrated in FIG. 1C, the second optical component sample of the present invention also remained transparent.

In addition, a second set of identical optical components (same as above optical component samples, including same size and dimensions as above) of the present invention underwent high energy neutron testing. Both optical components were transparent in the visible spectral region before exposure to any radiation. The tests for neutron radiation were conducted at neutron fluxes ranging from 3×10⁹ to 1×10¹⁴ n/cm² sec and fluencies ranging from 2×10¹⁶ to 8.3×10²⁰ n/cm² for both samples. When exposed to the above radiation for over 90 days, both of the optical component samples of the present invention maintained their transparency, with identical results as those illustrated in FIGS. 1B and 1C. Accordingly, the radiation resistant characteristics of the optical components of the present invention provide high resistance against high levels of energy (wave or particle) without change in the transparency (e.g., no browning or darkening of the optical component—no solarization).

Figure 2:
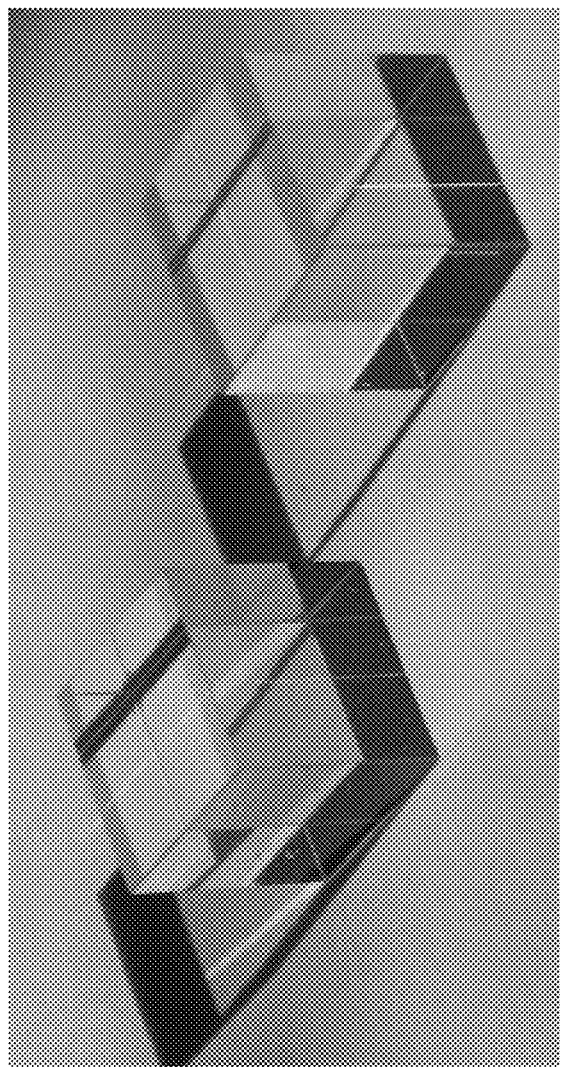
FIG. 2 is an exemplary optical component of the present invention, which was subjected to a laser damage threshold test in accordance with the present invention.

In addition to providing high radiation resistance (wave or particle), the optical components of the present invention also have a high level of resistance against laser damage. FIG. 2 exemplarily shows an optical component of the present invention, which was subjected to a laser damage threshold test (detailed below). As detailed in table II below, the optical components of the present invention have a high laser damage threshold, which is in part due to the addition of Ytterbium as a dopant. Accordingly, the optical components of the present invention (for example, a solid state laser or amplifier host) may be used in high energy environments as high energy optical components with high levels of laser damage threshold. In addition, due to unique spectroscopic properties, the optical components of the present invention can be used for ultraviolet, visual and near infrared optics in the band of about 350 to approximately 5,000 nm. The optical components of the present invention have high chemical durability, and are free of alkali-fluorides and bismuth metaphosphate.

Current commercially available high power vitreous optical components are mainly based on Nd or Er dopants. On the other hand, the optical components of the present invention use Yb dopants, which produce more than 1 Kw of energy and have low heat dissipation when stimulated to generate a laser effect. For example, fractional thermal loading of about 11% is produced when the optical laser product of the present invention having Yb dopant is stimulated or pumped with 945 nm wave energy. Conventional optical components that are doped with Nd generate a large amount of thermal loading of about 32% when stimulated or pumped with only 808 nm wave energy. It should be noted that generated thermal load in high power lasers is a great concern in that the higher the generated thermal loading, the lower the laser energy output. As the thermal load increases, it reduces the laser output efficiency. In the above example, the output efficient of the high power optical component of the present invention with Yb dopant is at approximately 89%. Conventional optical components with Nd dopant have a mere 68% output efficiency with the remaining energy converted and dissipated as heat. In addition, Quantum Defects or Stokes shift are only 9% in Yb doped laser optical components of the present invention, where as they are about 24% in Nd doped laser optical components. That is, the actual wavelength output from the laser host of the present invention with Yb dopant is varied by only 9% from its supposed ideal wavelength output. This is significant in that, at high powers, the laser host of the present invention (with the Yb dopants) generate laser wavelengths that are close to being pure (or at worst, shift by a mere 9%) from their supposed ideal laser wavelength output.

During the excitation process (for laser applications) under high levels of energy, the Yb dopant in the optical components of the present invention can concurrently perform two functions. One function of the Yb is to act as a desolarizer by maintaining the optical component of the present invention transparent due to the constant desolarization process of Yb when used in high energy environments (mentioned above). The other function of the Yb within the optical component of the present invention is to act as laser dopant, when stimulated. That is, when used as a laser optical component, some of the Yb dopants within the optical component of the present invention are excited to generate output laser energy, when stimulated. It should be noted that both functions can occur simultaneously. That is, the optical component of the present invention when used as a laser product and placed in a high energy environment, when excited, the Yb dopant will function as a laser dopant and also, function as desolarizer. Accordingly, the optical components of the present invention are ideal for use in laser applications, high energy applications, or simultaneously, in both laser and high energy applications. For example, the use of optical components of the present invention as laser hosts are ideal for use in high energy laser devices that may be used for the generation of nuclear energy through the process of nuclear fusion or in applications that need to work in deep space (where exposure to different types of radiation is imminent).

Examples of effective compositions and properties of the optical components of the present invention are illustrated in Table I based on mol percent and weight percent.

TABLE I

| Composition of Glass (mol %) | | | $Yb_2O_3$ or $YbF_3$ Dopant (wt %) Over 100% | Refractive Index nD | Density g/cm$^3$ | Emission Cross-section pm$^2$ @ 996 nm | Gain Coefficient (ms * pm$^4$) G | Quantum Efficiency % |
|---|---|---|---|---|---|---|---|---|
| $Ba(PO_3)_2$ | $Al(PO_3)_3$ | $BaF_2$ + RFx | | | | | | |
| 40 | 48 | 12 | 1 | 1.5878 | 4.15 | 0.87 | 0.95 | 90 |
| 35 | 13 | 52 | 1 | 1.5886 | 4.20 | 0.95 | 1.55 | 92 |
| 28 | 10 | 62 | 1 | 1.5895 | 4.28 | 1.29 | 1.60 | 93 |
| 10 | 16 | 74 | 1 | 1.5914 | 4.32 | 1.37 | 1.65 | 94 |

Where RFx is one of $MgF_2$, $CaF_2$, $BiF_3$, $YF_3$, $LaF_3$.

In the above example, $Yb_2O_3$ or $YbF_3$ would be used as dopant.

The following procedures were used in testing for laser damage threshold (both bulk and surface) of the optical components of the present invention shown in FIG. 2:

1—Started at a low fluence/irradiance and tested 10 sites at 1 shot/site. Based on the number of sites damaged, the percentage of damage at that fluence was calculated.

2—Next, the fluence/irradiance was increased and another 10 sites at single shot/site were performed.

3—This procedure was repeated until a fluence/irradiance damaged 10/10 sites.

4—Next, the plotted percentage damage was tested versus the Fluence/Irradiance. The data was fitted to a line and the intercepted with the x-axis of the threshold value. All values are detailed in the following table II.

The bulk laser damage threshold for the optical components of the present invention was found to be 105+/−20 J/cm2. The laser damage threshold tests showed that surface laser damage threshold for the optical components of the present invention was found to be 72+/−15 J/cm2. The laser source was: Nd:YAG, Beam Radius=9.5 micron (Hwe−1 M), Pulsewidth=1.7 ns (Hwe−1 M), Wavelength=1.064 micron. This newly discovered laser damage threshold data relating to the optical components of the present invention seems to be the highest among most known commercially available optical components currently in existence.

TABLE II

Beam Radius = 9.5 μm (HW1/eM)
Pulsewidth = 1.7 ns (HW1/eM)
Wavelength = 1.064 μm
Testing method: 10 sites at each fluence, 1 shot per site
% DMG = percentage (N/10 * 100) of sites damaged at given fluence

|  | Avg Fluence(J/cm$^2$) | Avg Irradiance (GW/cm$^2$) | % DMG |
|---|---|---|---|
| Bulk | 100 | 33.1876 | 0 |
|  | 125 | 41.4845 | 10 |
|  | 145.1153 | 48.16031485 | 20 |
|  | 182.8112 | 60.67069616 | 50 |
|  | 225.0739 | 74.69668157 | 60 |
|  | 248.028 | 82.31458645 | 70 |
|  | 270.4212 | 89.7463645 | 40 |
|  | 295.6787 | 98.12871882 | 70 |
|  | 319.9747 | 106.1919986 | 30 |
|  | 371.7115 | 123.3621978 | 80 |
|  | 424.5899 | 140.911298 | 80 |
|  | 481.3942 | 159.763286 | 100 |
| Surface | 9.714412 | 3.22398243 | 0 |
|  | 21.25153 | 7.052877027 | 0 |
|  | 47.91108 | 15.9005484 | 0 |
|  | 72.02686 | 23.90400168 | 0 |

TABLE II-continued

Beam Radius = 9.5 μm (HW1/eM)
Pulsewidth = 1.7 ns (HW1/eM)
Wavelength = 1.064 μm
Testing method: 10 sites at each fluence, 1 shot per site
% DMG = percentage (N/10 * 100) of sites damaged at given fluence

| Avg Fluence(J/cm$^2$) | Avg Irradiance (GW/cm$^2$) | % DMG |
|---|---|---|
| 99.76801 | 33.11063192 | 30 |
| 115.3912 | 38.29559336 | 30 |
| 131.6353 | 43.68662377 | 60 |
| 148.6606 | 49.33690225 | 50 |
| 166.8075 | 55.35943438 | 40 |
| 186.5968 | 61.9270522 | 50 |

As stated above, the optical components of the present invention have applications in numerous fields that may be used in high energy environments that may also require high laser damage threshold. Non-limited, non-exhaustive examples of applications may include windows, substrate for optical mirrors, space solar panel covers, lenses, fiber, fiber amplifier hosts, fiber laser hosts, solid state amplifier hosts, solid state laser hosts (e.g., thin disc laser (active mirror)), etc. The amount or concentration of $Yb_2O_3$ or $YbF_3$ dopants within the optical components of the present invention to provide radiation resistant products with superior optical characteristics may vary depending on the specific application of the optical component, including the optical component physical dimensions. For example, for active optical components of the present invention (e.g., laser hosts, etc.) there is a need to balance dopant-concentration quenching in relation to optimized optical emission and optical component radiation resistance characteristics of the optical component when $Yb_2O_3$ or $YbF_3$ dopants are added. On the other hand, for non-active optical components of the present invention (e.g., an optical window), there is a need to balance dopant-concentration quenching in relation to optimized transparency and optical component radiation resistance characteristics when $Yb_2O_3$ or $YbF_3$ dopants are added. Accordingly, the Table III below is an exemplary, non-exhaustive, non-limiting, listing of the amounts or concentration of $Yb_2O_3$ or $YbF_3$ dopants needed for a set of exemplary products.

TABLE III

| | $Yb_2O_3$ ($YbF_3$)(wt. %) Dopet Radiation Resistant with High Laser Damage Threshold Optical Components | | | | |
|---|---|---|---|---|---|
| Composition of the Optical Component | Solid State Laser/Amplifier host | Thin Disc Laser host | Fiber Laser/Amplifier host | Windows, Mirrors, Solar Panel Covers | Lens |
| $Ba(PO_3)_2$, 10 to 60 mol %; $Al(PO_3)_3$, 10 to 60 mol %; $BaF_2$ + RFx, 20 to 90 mol %; | 0.5-5 | 1-10 | 0.5-3 | 1-6 | 1-5 |
| $Ba(PO_3)_2$, 20 to 50 mol %; $Al(PO_3)_3$, 10 to 60 mol %; $BaF_2$ + RFx, 20 to 90 mol %; | 1-3 | 2-15 | 0.5-2.5 | 2-8 | 0.5-4.5 |
| $Ba(PO_3)_2$, 10 to 60 mol %; $Al(PO_3)_3$, 10 to 60 mol %; $BaF_2$ + RFx, 10 to 75 mol %; | 0.5-2.5 | 3.5-6 | 1-1.5 | 1.5-10 | 1.5-5.5 |
| $Ba(PO_3)_2$, 5 to 60 mol %; $Al(PO_3)_3$, 5 to 60 mol %; $BaF_2$ + RFx, 10 to 90 mol %; | 0.2-3 | 4-20 | 0.5-2 | 3-10 | 2-5 |

Where RFx is one of $MgF_2$, $CaF_2$, $BiF_3$, $YF_3$, $LaF_3$.

Figure 3B:
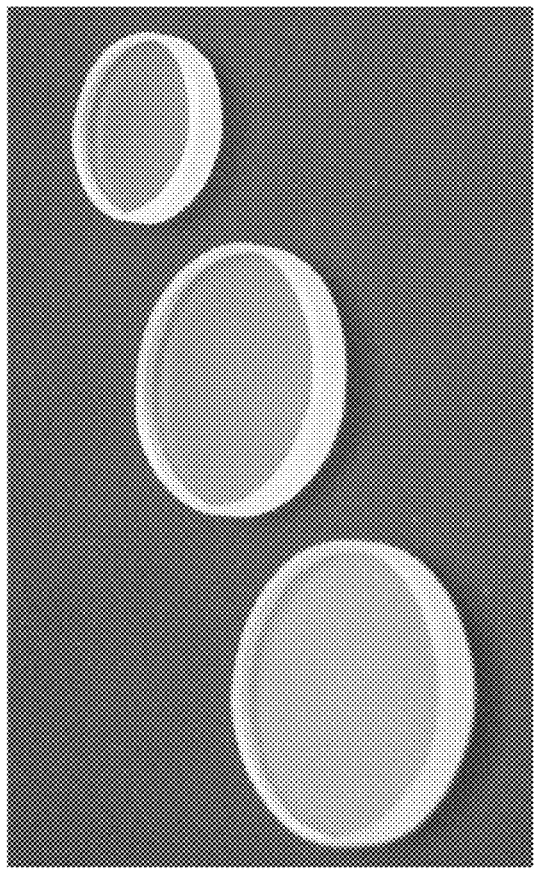
FIG. 3B is a view of an exemplary optical component of the present invention in the exemplary form of a disc in accordance with the present invention.
Figure 3A:
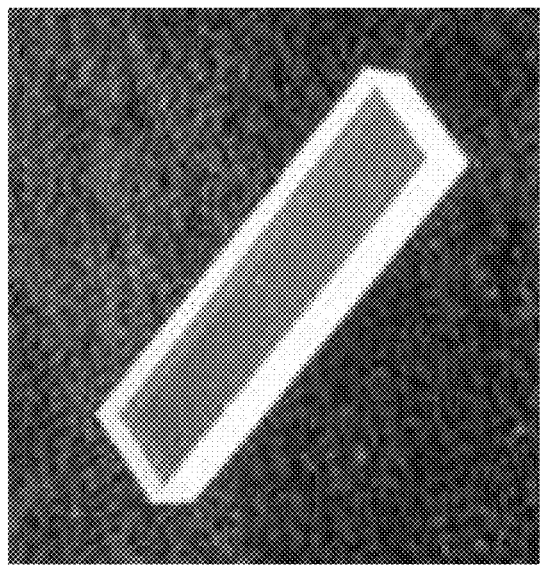
FIG. 3A is view of an exemplary optical component of the present invention in the exemplary form of a solid state laser/amplifier host in accordance with the present invention.

FIG. 3A is a view of an exemplary solid state laser/amplifier host in accordance with the present invention, which may comprise of composition and dopant amounts or concentrations detailed in Table III. For example, as detailed in Table III, for a solid state laser/amplifier host shown in FIG. 3A, the optical component composition may include $Ba(PO_3)_2$, 10 to 60 mol %; $Al(PO_3)_3$, 10 to 60 mol %; $BaF_2$+RFx, 20 to 90 mol %; with $Yb_2O_3$ or $YbF_3$ dopant concentration between 0.5 to 5 wt %. As detailed in Table III, RFx is one of $MgF_2$, $CaF_2$, $BiF_3$, $YF_3$, $LaF_3$. Accordingly, the solid state laser/amplifier host of the present invention shown in FIG. 3A with the mentioned composition concentrations detailed in Table III provides low dopant-concentration quenching, high optical emission, and high radiation resistance.

FIGS. 1C and 2 are views of exemplary windows in accordance with the present invention, which may be shaped and polished into minors, thin film solar panel covers, etc. The optical components of FIGS. 1C and 2 may comprise of composition and dopant amounts or concentrations detailed in Table III. For example, as detailed in Table III, for a window shown in FIGS. 1C and 2, the optical component composition may include $Ba(PO_3)_2$, 10 to 60 mol %; $Al(PO_3)_3$, 10 to 60 mol %; $BaF_2$+RFx, 20 to 90 mol %, with $Yb_2O_3$ or $YbF_3$ dopant concentration of about 5 wt %. As detailed in Table III, RFx is one of $MgF_2$, $CaF_2$, $BiF_3$, $YF_3$, $LaF_3$. Accordingly, the window of the present invention shown in FIGS. 1C and 2 with the mentioned composition concentrations detailed in Table III provides low dopant-concentration quenching, high optical transparency, and high radiation resistance.

As mentioned above, the windows shown in FIGS. 1C and 2 can be made into a minor by a coating on one side and used as a mirror substrate. In addition, the glass windows of FIGS. 1C and 2 can be cut and polished and be used as a solar panel cover, with a thickness of approximately 200 to 250 microns. That is, the optical components of the present invention (shown in FIGS. 1C and 2) may also be prepared in large plates, the sizes of which are based on the manufacturing facility. In general, the glass plate may be softened in temperatures ranging from about 550° C. to 650° C. and rolled through rolling machinery. Once the glass is reduced to about a 3 mm thickness, the plates are transferred into a final shaping and polishing facility to achieve the desired final shape and thickness. In the experiment to demonstrate the practical manufacturing of the optical solar panel cover of the present invention, the optical components shown were successfully polished up to 250 microns in thickness, which considerably improved transparency by about 90% from 250 nm to 5000 nm. The thinner the glass is, the higher its transparency.

FIG. 3B is a view of an exemplary optical component of the present invention in the form of a thin disc in accordance with the present invention, which may comprise of composition and dopant amounts or concentrations detailed in Table III. For example, as detailed in Table III, for a thin disc laser hosts shown in FIG. 3A, the optical component compositions may include $Ba(PO_3)_2$, 10 to 60 mol %; $Al(PO_3)_3$, 10 to 60 mol %; $BaF_2$+RFx, 20 to 90 mol %; with $Yb_2O_3$ or $YbF_3$ dopant concentration of approximately 1-10 wt %. As detailed in Table III, RFx is one of $MgF_2$, $CaF_2$, $BiF_3$, $YF_3$, $LaF_3$. Accordingly, the thin disc laser hosts of the present invention shown in FIG. 3B with the mentioned composition concentrations detailed in Table III provides low dopant-concentration quenching, high optical emission, and high radiation resistance. It should be noted that the thin disk laser host material can be sliced, shaped, and polished to approximate thickness of 150 to 200 microns with varying diameters, depending on application.

Figure 3C:
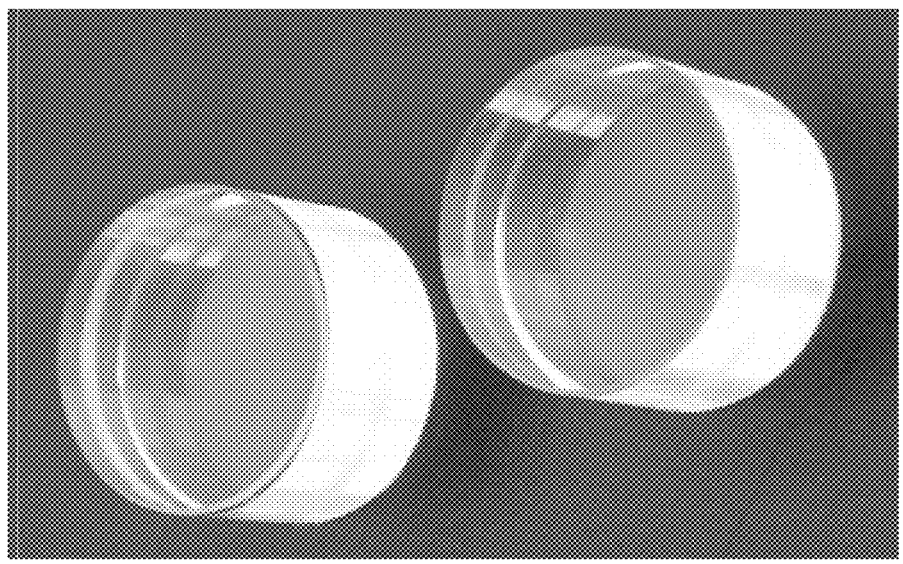
FIG. 3C is a view of an exemplary optical component of the present invention in the exemplary form of a disc that may be cut, shaped, and polished into a lens in accordance with the present invention.

FIG. 3C is a view of an exemplary optical component of the present invention in the exemplary form of a disc that may be cut, shaped and polished into a lens in accordance with the present invention, which may comprise of composition and dopant amounts or concentrations detailed in Table III. For example, as detailed in Table III, for a lens, the optical component compositions may include $Ba(PO_3)_2$, 10 to 60 mol %; $Al(PO_3)_3$, 10 to 60 mol %; $BaF_2$+RFx, 20 to 90 mol %; with optimum $Yb_2O_3$ or $YbF_3$ dopant concentration is approximately 1-5 wt %. As detailed in Table III, RFx is one of $MgF_2$, $CaF_2$, $BiF_3$, $YF_3$, $LaF_3$. Accordingly, the lens of the present invention with the mentioned composition concentrations detailed in Table III provides low dopant-concentration quenching, high optical transparency, and high radiation resistance.

The optical component of the present invention in the form of a lens has an Abba Number that is remarkably constant. That is, the change of linear refractive index in Ytterbium doped optical components of the present invention used as lens has been found to increase with increasing dopant concentration due to the dense packing of dopant materials into host materials, while the Abbe Number for the optical lens of the present invention is found to be remarkably constant, i.e., approximately 64-68 for a wide dopant concentration. On the other hand, the non-linear refractive index remained low at $n_2=1.42\times10^{-13}$ esu (electrostatic unit). The following table IV provides the optical characteristics of the lens of the present invention.

TABLE IV

| $Yb_2O_3$ | 0 wt % | 1 wt % | 2 wt % | 3 wt % | 4 wt % | 5 wt % |
|---|---|---|---|---|---|---|
| nF 486 nm | 1.5933 | 1.5940 | 1.5950 | 1.5965 | 1.5984 | 1.6003 |
| nD 589 nm | 1.5872 | 1.5878 | 1.5888 | 1.5898 | 1.5919 | 1.5940 |
| nC 656 nm | 1.5847 | 1.5850 | 1.5860 | 1.5873 | 1.5894 | 1.5915 |
| Abbe Number | 68.28 | 65.31 | 65.42 | 64.10 | 65.76 | 67.50 |

The manufacturing process of the optical components of the present invention can be maximized by using the non-limiting, exemplary pot melt process, where materials are manufactured in an inert atmosphere created by Ar or other inert gases. The melting of the main batch (comprised of $Al(PO_3)_3$— $Ba(PO_3)_2$—$BaF_2$+RFx+dopant) is conducted in different types of crucibles, depending on the final optical component application and use. In general, the presence of Platinum (Pt) is considered to be a major contamination issue for processing of most optical components. The presence of Pt in optical components substantially lowers their radiation resistance levels. Accordingly, for high radiation energy applications the preferred, non-limiting example of a crucible used may include the use of vitreous carbon or graphite crucibles, rather than a Platinum based crucible. In general, the use of vitreous carbon or graphite crucibles control the overall allowable contamination of the main batch with respect to Pt, up to 500 ppb of Platinum (Pt). On the other hand, for application not requiring high levels of radiation resistance 95% Pt and 5% Au non-stick crucible, or, alternatively, 100% Pt crucible may be used. In these applications, the Pt contamination was found to be 5000 ppb, which is acceptable for optical components, including for those with some levels of radiation resistance.

To continue with the pot melt process, the main batch is melted at approximately 1100° C. to 1280° C. (e.g., preferably, 1260° C.) for 4 to 6 hours or more until a homogeneous melt is achieved. The homogeneity of the melt is enhanced by mixing the melt. Next, the glass of the present invention is poured into a mold for cooling and annealing. The cutting, shaping, and polishing of the optical components is then produced from the main bulk for desired applications.

The next process is to cut the optical components into desired configurations for required applications, which would require the polishing of the cut surfaces of the optical components. The optical components of the present invention can be polished in accordance with industry requirements.

However, it should be noted that most conventional fluorophosphate based glass systems cannot be polished to levels in accordance with the present invention (indicated in the tables of FIGS. 4B and 4D) because they have a very low chemical durability in that they dissolve in polishing substances, such as water during the polishing process.

Figure 4A:
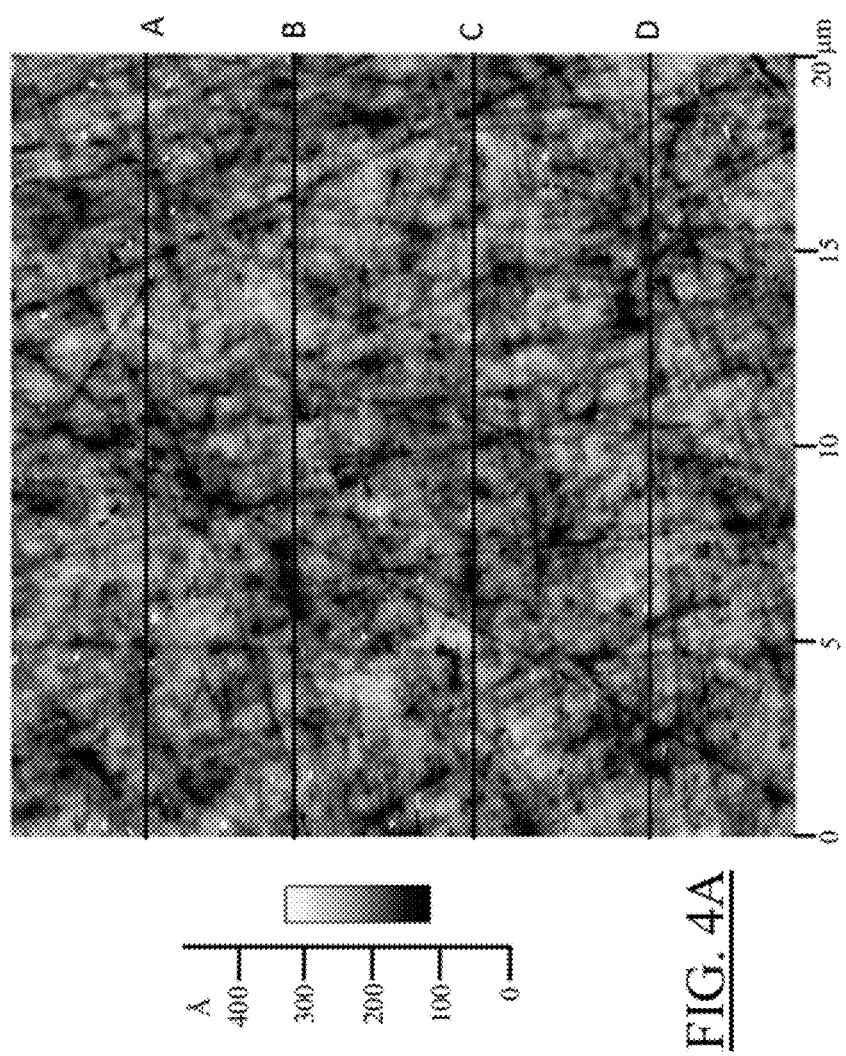
FIG. 4A exemplarily shows a topography of one polished side of a cubed optical component of the present invention.
Figure 4C:
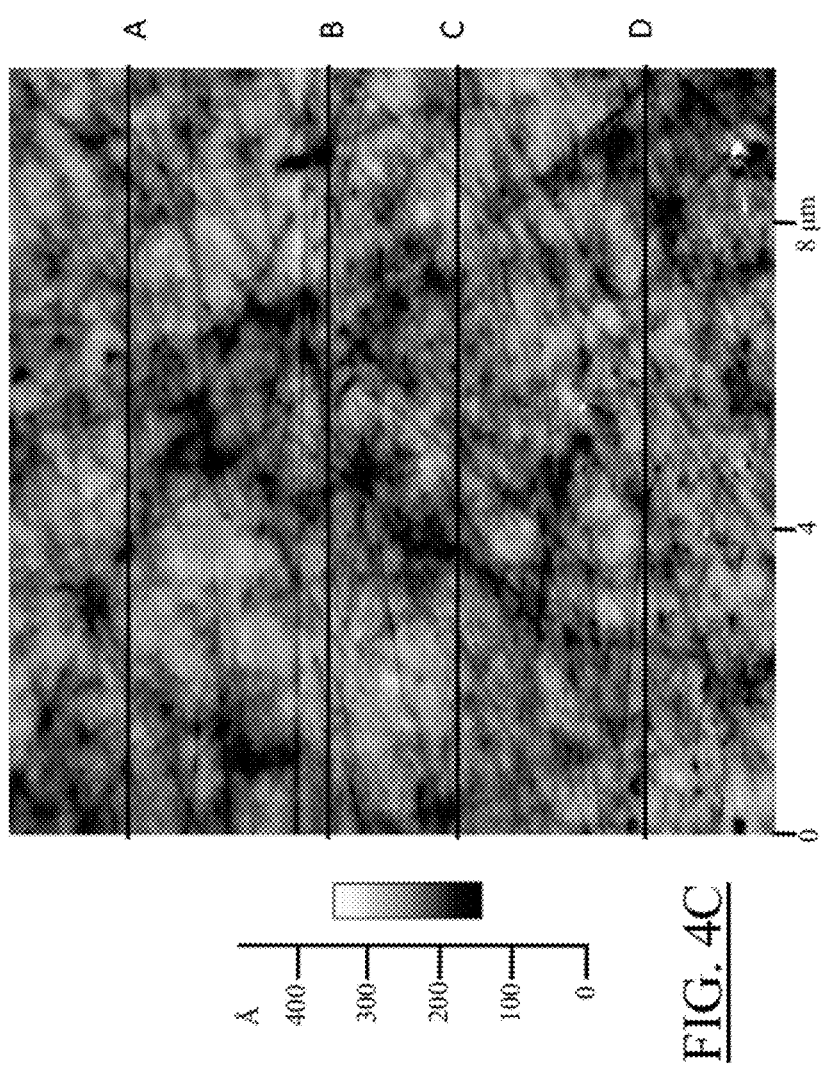
FIG. 4C exemplarily shows a topography of another polished side of the same cubed optical component of the present invention shown in FIG. 4A.

FIG. 4A exemplarily shows one polished side of a cubed optical component of the present invention, and FIG. 4B is a table, which details the numerical data with respect to the surface quality in terms of polished optical component end product for the side shown in FIG. 4A. FIG. 4C exemplarily shows another polished side of the same cubed optical component of the present invention shown in FIG. 4A, and FIG. 4D is a table, which details the numerical data with respect to the surface quality in terms of polished optical component end product for the side shown in FIG. 4C. It should be noted that the physico-chemical and thermo-mechanical characteristics of the optical components of the present invention enable the polishing of the present invention optical components at levels indicated in the FIGS. 4B to 4D. The following table V is an exemplary, non-exhaustive, non-limiting listing of physico-chemical and thermo-mechanical characteristics of the optical components of the present invention:

TABLE V

| Present Invention Optical Components | $Yb_2O_3$ dopant |
|---|---|
| Thermo-mechanical | |
| Knoop Hardness (kgf/mm$^2$) | 335.6 to 359.2 |
| Thermal Expansion (micrometer/° C.) | 0.02295 to 0.02309 |
| Physical | |
| Density (g/cc) | 4.248 to 4.574 |

It should be noted that the act of polishing of the optical components of the present invention to levels detailed in FIGS. 4A to 4D in accordance with the present invention is required and important for most optical applications, which is not possible with most conventional fluorophosphate glass systems. FIG. 4A is an actual microscopic photograph of a small section (about 20 micrometers) of a side of the polished surface of the sample optical component of the present invention. FIG. 4C is also an actual microscopic photograph of a small section (about 8 micrometers) of another side of the polished surface of the same sample optical component of the present invention shown in FIG. 4A. The indicated horizontal lines A, B, C, and D are horizontal scanning lines of the polished surface of the sampled optical component. The sampled optical component was scanned along the horizontal lines A, B, C, and D for measuring surface variations (e.g., depth) after sample was completely polished, with the resulting data illustrated in the corresponding respective tables of FIGS. 4B and 4D.

FIGS. 4B and 4D are tables that show extrapolated data from the measured scan lines A, B, C, and D of the respective FIGS. 4A and 4C. As illustrated in the tables of FIGS. 4B and 4D, each respective row of the table corresponds to respective scan lines A, B, C, and D in respective FIGS. 4A and 4C. As illustrated in table of FIG. 4B, the extrapolated data from the respective scan lines of FIG. 4A has an average Roughness Peak-to-Valley (Roughness$_{P-V}$) of about 118 Å, with an average Root-Mean-Square (RMS) of about 21.0 Å, and an average of about 16.4 Å. As illustrated in table of FIG. 4D, the extrapolated data from the respective scan lines of FIG. 4C has an average Roughness Peak-to-Valley (Roughness$_{P-V}$) of about 132 Å, with an average Root-Mean-Square (RMS) of about 24.2 Å, and an average of about 19.1 Å.

The results of (FIG. 4A and FIG. 4C) of the same optical component of the present invention clearly indicate that the surface of the polished sampled optical component of the present invention is near perfect. That is, the polished surface has minimal roughness. This negligible roughness meets and exceeds the polished surface requirements for most (if not all) optical applications. In addition, it should be noted that the minimal, negligible roughness level measurement of the polished surface of the sampled optical component enables the use of the optical components of the present invention in very high power lasers by improving their overall performance. That is, the reduced roughness substantially reduces surface losses due to laser light scattering, which are minimized as a result of polishing. In addition, such high levels of polishing enables the final product to be tested at various laser damage threshold levels (detailed above). As mentioned, most conventional optical components cannot be polished to levels in accordance with the present invention (indicated in the tables of FIGS. 4B and 4D) because they have a very low chemical durability in that they dissolve in polishing substances, such as water during the polishing process.

As stated above, the optical components of the present invention have applications in numerous fields that may be used in high energy environments that may also require high laser damage threshold, one non-limited example of which is an optical fiber (active or passive). Generally, the conventional fluorophosphate based glasses have a tendency to become crystallized during what is known as the fiber drawing process to produce optical fibers. Accordingly, conventional fluorophosphate based glasses are generally not used to produce optical fiber components. The drawback with most conventional fluorophosphate based glasses is that the rate of change of their viscosity in relation to variations in temperature is usually high, wherein crystallization takes place. That is, small increments in increases in temperature greatly reduces their viscosity, within which crystallization occurs, which prevents the use of most conventional fluorophosphate based glasses for making optical fiber products. In other words, with most conventional fluorophosphate based glasses, their drawing (or pulling temperature) $T_D$ (when they become sufficiently viscous to be pulled into a fiber) is very close (i.e., similar) to their crystallization temperature $T_c$, so they crystallize. Other factors contributing to crystallization may include, for example, the use of alkali elements in the glass composition, which has the tendency to increase crystallization during the fiber draw process. However, the optical components of the present invention do not have alkali elements, and have pulling or drawing temperature $T_D$ that is substantially different from their crystallization temperature $T_c$. Accordingly, the optical components of the present invention are easily modified to manufacture and produce optical fibers with high radiation resistance and high laser damage thresholds, and were successfully pulled to a transparent fiber (FIGS. 1A and 1B), using the following relatively low cost techniques.

Figure 5:
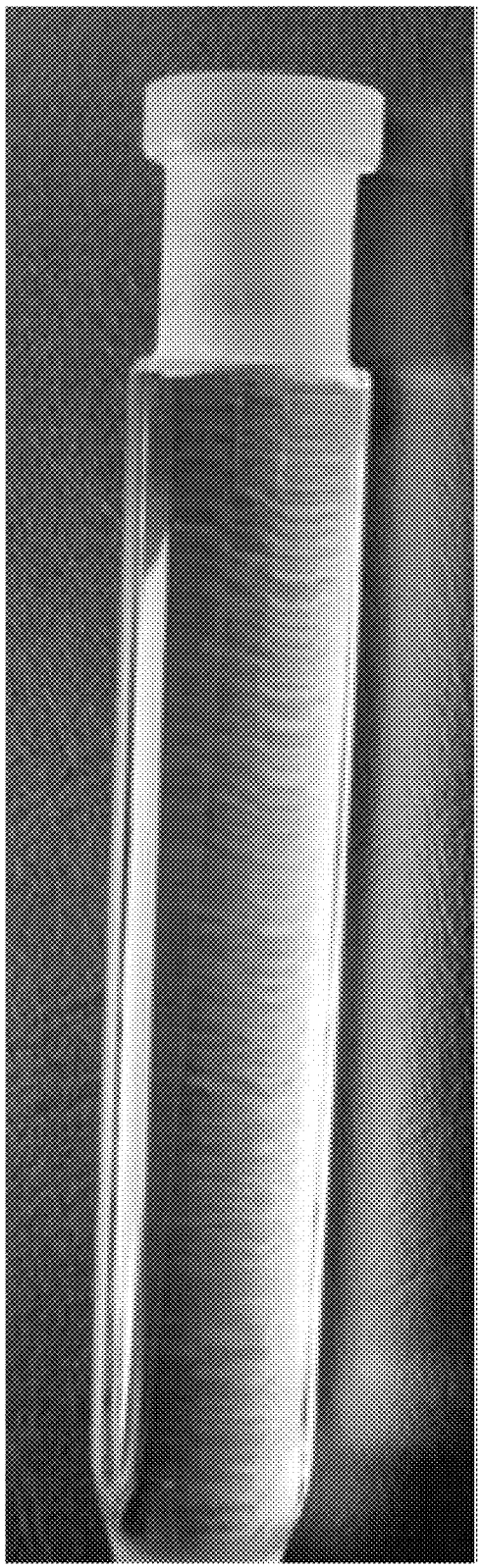
FIG. 5 is a view of an exemplary optical component in the exemplary form of glass-rod in accordance with the present invention.

The manufacturing process for producing fiber (the "fiber draw")(exemplarily shown in FIGS. 1A and 1B) from the optical components of the present invention ($Al(PO_3)_3$—$Ba(PO_3)_2$—$BaF_2$+RFx+dopant) was generally done within an inert gas atmosphere, such as Ar gas. The fiber drawing (or the fiber production from the "rod" of glass system produced from the Melt Pot process above) is conducted in an inert gas (e.g., Ar) atmosphere by the application of heat as follows. An example of an optical component in the exemplary form of a glass-rod in accordance with the present invention is shown in FIG. 5.

The heat up schedule for the optical component of the present invention in the form of a rod shown in FIG. 5 was as follows:

3° C./minute up to just above the glass transition temperature (Tg) of 540° C., 5 minute hold there, then 5° C./min. to 620° C., the anticipated draw temperature.

10 minute hold at 620° C. When no drop obtained, increased to 630° C.

5 minute hold at 630° C. When no drop obtained, increased to 640° C.

5 minute hold at 640° C. When no drop obtained, increased to 650° C.

5 minute hold at 650° C. When no drop obtained, increased to 660° C.

5 minute hold at 660° C. When no drop obtained, increased to 670° C.

5 minute hold at 670° C. When no drop obtained, increased to 690° C.

5 minute hold at 690° C. When no drop obtained, increased to 710° C.

Obtained a drop at 710° C. Lower temperature to 690° C.

As noted above, the "rod" glass of the present invention (shown in FIG. 5) was heated at 3° C./minute up to just above the glass transition temperature (Tg) of 540° C. The glass transition temperature (Tg) is the threshold wherein the glass transitions from a solid state to a more malleable (e.g., soft) condition. The rod glass of the present invention was then held at 540° C. for about 5 minute, which created a uniform thermal condition for the whole rod. Thereafter, the "rod" glass was then exposed to a progressively increasing rate of temperature of about 5° C./min. up to 620° C., which is the anticipated draw temperature for the optical fiber component of the present invention.

As further noted above, the rod glass was held at 620° C. for about 10 minutes. However, no "drop" or "fall" in the rod glass was observed. That is, the rod glass did not become sufficiently malleable or soft where it could stretch and drop or fall onto a fiber draw reel (shown in FIG. 1A) for drawing or pulling the rod glass into strands of the optical fiber component of the present invention. Accordingly, the "rod" glass was then exposed to an increased temperature of 630° C., where the rod glass was held at 630° C. for about 5 minutes. However, no "drop" or "fall" in the rod glass was observed, and accordingly, the temperature was increased to about 640° C. The process continued on as noted above until a drop was obtained at 710° C., where the temperature was then lowered to 690° C.

The following are the draw observations from the above fiber draw method. The initial drop obtained at 710° C. showed that the draw tension was too low, accordingly, the temperature was lowered to 690° C. The fluorophosphate rod of the present invention appeared to draw well at this temperature, with some slight surface crystallization noted on the initial drop, but was clear up as the draw was established. Over 1,200 feet of the optical fiber component sample of the present invention was collected (drawn or pulled) during this experiment from the fluorophosphates glass system of the present invention in the form of an exemplary rod shown in FIG. 5 with dimensions of about 10 mm (diameter) and about 97.1 mm (length). After the draw, the fiber strength noted in tension appeared good for this type glass, and the rod was cooled down at 3° C./min. It should be noted that similar process may be used for producing the core and the cladding elements of the optical fiber component of the present invention.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. For example, the optical components of the present invention may be used in numerous other applications that have not been explicitly mentioned. In addition, it should be noted that none of the FIGS are to scale. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. An optical component, consisting of:
a metaphosphate $Ba(PO_3)_2$, 5 to 60 mol %;
a metaphosphate $Al(PO_3)_3$, 5 to 60 mol %; and
fluorides;
where the fluorides includes both $BaF_2$ and $RF_3$, 20 to 90 mol %;
where R is selected from a group consisting of one of Y and La;
with dopant selected from one of $Yb_2O_3$ and $YbF_3$, 0.5 to 10 wt % over 100.

2. An optical component, consisting of:
a metaphosphate $Ba(PO_3)_2$, 20 to 50 mol %;
a metaphosphate $Al(PO_3)_3$, 10 to 60 mol %; and
fluorides;
where the fluorides include both $BaF_2$ and $RF_3$, 20 to 70 mol %;
where R is selected from a group consisting of one of Y and La;
with dopant selected from one of $Yb_2O_3$ and $YbF_3$, 0.5 to 15 wt % over 100.

3. An optical component, consisting of:
a metaphosphate $Ba(PO_3)_2$, 10 to 60 mol %;
a metaphosphate $Al(PO_3)_3$, 10 to 60 mol %; and
fluorides;
where the fluorides include both $BaF_2$ and $RF_3$, 10 to 80 mol %;
where R is selected from a group consisting of one of Y and La;
with dopant selected from one of $Yb_2O_3$ and $YbF_3$, 0.5 to 10 wt % over 100.

4. An optical component, consisting of:
a metaphosphate $Ba(PO_3)_2$, 5 to 60 mol %;
a metaphosphate $Al(PO_3)_3$, 5 to 60 mol %; and
fluorides;

where the fluorides include both $BaF_2$ and $RF_3$, 10 to 90 mol %;
where R is selected from a group consisting of one of Y and La;
with dopant selected from one of $Yb_2O_3$ and $YbF_3$, 0.2 to 20 wt % over 100.

5. Optical components, consisting of:
a metaphosphate $Ba(PO_3)_2$ in mol %,
a metaphosphate $Al(PO_3)_3$ in mol %, and
fluorides;
where the fluorides include both $BaF_2$ and $RF_3$ in mol %,
with dopant selected from one of $Yb_2O_3$ and $YbF_3$, contained in an amount over 100 percent (wt %);
where:
R is selected from the group consisting of Y, La;
with the optical components maintaining transparency in high energy environments:
including application of high-intensity gamma-ray radiation dosage of $1.29 \times 10^9$ rads and more; and
application of neutron energy at neutron fluxes ranging from $3 \times 10^9$ to $1 \times 10^{14}$ n/cm² sec and more, and fluencies ranging from $2 \times 10^{16}$ to $8.3 \times 10^{20}$ n/cm² and greater; and
with a bulk laser damage threshold of 105+/−20 J/cm², and a surface laser damage threshold of about 72 J/cm².

6. The optical component as set forth in claim 5, wherein:
the optical component is one of a solid state laser host and solid state amplifier host, with dopant selected from one of $Yb_2O_3$ and $YbF_3$ 0.5 to 5 wt % over 100.

7. The optical component as set forth in claim 5, wherein:
the optical component is a thin disc laser host, with dopant selected from one of $Yb_2O_3$ and $YbF_3$ 1 to 20 wt % over 100.

8. The optical component as set forth in claim 5, wherein:
the optical component is one of a fiber laser host and fiber amplifier host with dopant selected from one of $Yb_2O_3$ and $YbF_3$ 0.5 to 3 wt % over 100.

9. The optical component as set forth in claim 5, wherein:
the optical component is one of a window, mirror, and thin film covering for a solar panel, with dopant selected from one of $Yb_2O_3$ and $YbF_3$ 1 to 10 wt % over 100.

10. The optical component as set forth in claim 5, wherein:
the optical components is one of a lens, with dopant selected from one of $Yb_2O_3$ and $YbF_3$ 0.5 to 5.5 wt % over 100.

11. The optical component as set forth in claim 5, wherein:
a Stokes shift of the optical component is about 9%, and a fractional thermal loading of about 11%.

12. The optical component as set forth in claim 5, wherein:
the Yb dopant simultaneously functions to act as a desolarizer in high energy environments to maintain the optical components transparent and functions to act as laser dopant, when stimulated.

13. The optical component as set forth in claim 5, wherein:
the optical components are polished to a Roughness$_{p-v}$ of 118 Å to 132 Å.

14. The optical component as set forth in claim 5, wherein:
a draw temperature $T_D$ of the optical components to form an optical fiber is substantially different from that of a crystallization temperature $T_C$, with the draw temperature equaling to about 690° C.

15. The optical component as set forth in claim 5, wherein:
the optical component is a lens with an Abbe number of approximately 64 to 68 remains constant regardless of an increase in linear refractive index, with non-linear refractive index remaining low at about $n_2 = 1.42 \times 10^{-13}$ esu.

* * * * *